United States Patent
Yokoyama et al.

(10) Patent No.: US 9,823,837 B2
(45) Date of Patent: Nov. 21, 2017

(54) DISPLAY CONTROL DEVICE, DISPLAY CONTROL METHOD, AND DISPLAY CONTROL PROGRAM

(71) Applicant: PANASONIC CORPORATION, Osaka (JP)

(72) Inventors: Ryo Yokoyama, Kanagawa (JP); Toshio Oka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 318 days.

(21) Appl. No.: 14/358,409

(22) PCT Filed: Nov. 6, 2012

(86) PCT No.: PCT/JP2012/007086
§ 371 (c)(1),
(2) Date: May 15, 2014

(87) PCT Pub. No.: WO2013/080444
PCT Pub. Date: Jun. 6, 2013

(65) Prior Publication Data
US 2014/0298276 A1    Oct. 2, 2014

(30) Foreign Application Priority Data
Nov. 29, 2011    (JP) ................. 2011-260186

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 1/3262* (2013.01); *G06F 1/3265* (2013.01);
(Continued)

(58) Field of Classification Search
CPC ...................................................... G06F 3/048
See application file for complete search history.

(56) References Cited

U.S. PATENT DOCUMENTS

2002/0036618 A1    3/2002    Wakai et al.
2007/0146344 A1    6/2007    Martin et al.
(Continued)

FOREIGN PATENT DOCUMENTS

CN    101432796 A    5/2009
EP    2204793 A1    7/2010
(Continued)

OTHER PUBLICATIONS

Extended European Search Report for Application No. 12852724.9-1953/278500 dated Apr. 10, 2015.
(Continued)

*Primary Examiner* — Xuyang Xia
(74) *Attorney, Agent, or Firm* — Pearne & Gordon LLP

(57) ABSTRACT

This display control device can effectively reduce power consumption while assuring visibility of a display area. A display control device (400) carries out display control for a display panel with an integrated touch panel and has: a touch operation information acquisition unit (410) that acquires touch operation information from the touch panel; a user operation information estimation unit (420) that estimates a region of interest, which is a region that a user is giving attention to, from the display region on the display panel on the basis of the touch operation information that is acquired; and a display control indication unit (440) that sets the brightness level for regions of non-interest, which is a region other than the region of interest estimated within the display region, lower than the set brightness level.

7 Claims, 12 Drawing Sheets

(51) Int. Cl.
  *G06F 1/32* (2006.01)
  *G09G 5/10* (2006.01)
(52) U.S. Cl.
  CPC ....... *G09G 5/10* (2013.01); *G09G 2320/0626* (2013.01); *G09G 2320/0686* (2013.01); *G09G 2330/021* (2013.01); *G09G 2354/00* (2013.01); *Y02B 60/1242* (2013.01)

(56) References Cited

U.S. PATENT DOCUMENTS

| | | | |
|---|---|---|---|
| 2010/0090971 A1* | 4/2010 | Choi | G06F 3/04883 345/173 |
| 2010/0182332 A1 | 7/2010 | Ozawa et al. | |
| 2011/0018827 A1* | 1/2011 | Wang | G06F 3/0482 345/173 |
| 2011/0037576 A1* | 2/2011 | Jeon | G06F 1/1626 340/407.2 |
| 2011/0234522 A1* | 9/2011 | Lin | G06F 3/04883 345/173 |
| 2012/0032979 A1* | 2/2012 | Blow | G06F 1/1626 345/647 |
| 2013/0120282 A1* | 5/2013 | Kukulski | G06F 3/04883 345/173 |

FOREIGN PATENT DOCUMENTS

| | | |
|---|---|---|
| EP | 2214091 A2 | 8/2010 |
| EP | 2282491 A1 | 2/2011 |
| EP | 2302615 A2 | 3/2011 |
| JP | 06-095834 A | 4/1994 |
| JP | 2007-316606 A | 12/2007 |
| JP | 2007-333996 A | 12/2007 |
| JP | 2009-237210 A | 10/2009 |
| JP | 2010-145582 A | 7/2010 |
| JP | 2010-277545 A | 12/2010 |
| JP | 2011-007833 A | 1/2011 |
| JP | 2011-101296 A | 5/2011 |
| WO | 2006/020305 A2 | 2/2006 |
| WO | 2010/001672 A1 | 1/2010 |

OTHER PUBLICATIONS

Extended European Search Report for Application No. 12852724.9-1953/2787500 dated Jun. 7, 2015.
International Search Report for Application No. PCT/JP2012/007086 dated Feb. 5, 2013.
Written Reply for Application No. PCT/JP2012/007086 dated Feb. 5, 2013.

* cited by examiner

DISPLAY CONTROL DEVICE, DISPLAY CONTROL METHOD, AND DISPLAY CONTROL PROGRAM

TECHNICAL FIELD

The present invention relates to a display control apparatus, a display control method and a display control program for performing display control on a display panel of a touch panel.

BACKGROUND ART

In recent years, portable terminals including a touch panel-incorporated display panel have been increasingly popular as mobile phones or portable information processing terminals or the like. Such portable terminals (hereinafter, simply referred to as "portable terminals") use a power-driven display device such as organic EL (electro luminescence), LCD (liquid crystal display), or LED (light emitting diode) as a display panel.

Many portable terminals are driven by battery and thus become inoperable when remaining battery power falls to or below a predetermined level. Therefore, reducing power consumption of such portable terminals is important to extend their continuously operable time.

Power-saving techniques relating to a display panel of a portable terminal are disclosed, for example, in PTL 1 and PTL 2.

The technique described in PTL 1 reduces, when no operation of a portable terminal is detected for a certain period of time, brightness of an overall display region (screen on a display panel) depending on the importance of an image being displayed. On the other hand, the technique described in PTL 2 identifies a region which is predicted to be continuously viewed by the user, based on the position of a cursor operated by the user, and reduces the brightness of regions other than the identified region.

CITATION LIST

Patent Literature

PTL 1
Japanese Patent Application Laid-Open No. 2010-145582
PTL 2
Japanese Patent Application Laid-Open No. 2011-101296

SUMMARY OF INVENTION

Technical Problem

The technique disclosed in PTL 1, however, cannot reduce the brightness while operation is in progress. In the technique disclosed in PTL 2, the region being viewed by the user may not coincide with the position of a cursor, which may cause the brightness of the region viewed by the user to decrease, compromising user comfort (hereinafter, referred to as "viewability of display region") when viewing the display region. That is, the techniques according to the related art have a problem in that it is difficult to effectively reduce power consumption while securing viewability of the display region.

A reduction in power consumption is required not only for display panels of portable terminals but also for display panels of various other electronic devices. Therefore, there is a demand for a technique capable of effectively reducing power consumption while securing viewability of a display region for display panels of various electronic devices.

An object of the present invention is to provide a display control apparatus, a display control method and a display control program capable of effectively reducing power consumption while securing viewability of a display region.

Solution to Problem

A display control apparatus according to an aspect of the present invention is a display control apparatus that performs display control on a touch-panel-incorporated display panel, the display control apparatus including: a touch operation information acquiring section that acquires touch operation information from the touch panel; a user operation information estimation section that estimates a target region from a display region of the display panel based on the acquired touch operation information, the target region being a region of interest of a user; and a display control instruction section that sets a brightness level of a non-target region to be lower than a set brightness level, the non-target region being a region other than the target region estimated in the display region.

A display control method according to an aspect of the present invention is a display control method for performing display control on a touch-panel-incorporated display panel, the method including: acquiring touch operation information from the touch panel; estimating a target region from a display region of the display panel based on the acquired touch operation information, the target region being a region of interest of a user; and setting a brightness level of a non-target region to be lower than a set brightness level, the non-target region being a region other than the target region estimated in the display region.

A display control program according to an aspect of the present invention is a program that causes a computer that performs display control on a touch-panel-incorporated display panel to function as: a touch operation information acquiring section that acquires touch operation information from the touch panel; a user operation information estimation section that estimates a target region from a display region of the display panel based on the acquired touch operation information, the target region being a region of interest of a user; and a display control instruction section that sets a brightness level of a non-target region to be lower than a set brightness level, the non-target region being a region other than the target region estimated in the display region.

Advantageous Effect of the Invention

According to the present invention, it is possible to effectively reduce power consumption while securing viewability of a display region.

DESCRIPTION OF EMBODIMENTS

Hereinafter, embodiments of the present invention will be described in detail with reference to the accompanying drawings.

(Embodiment 1)

Embodiment 1 of the present invention is an example of a basic mode of the present invention.

Figure 1:
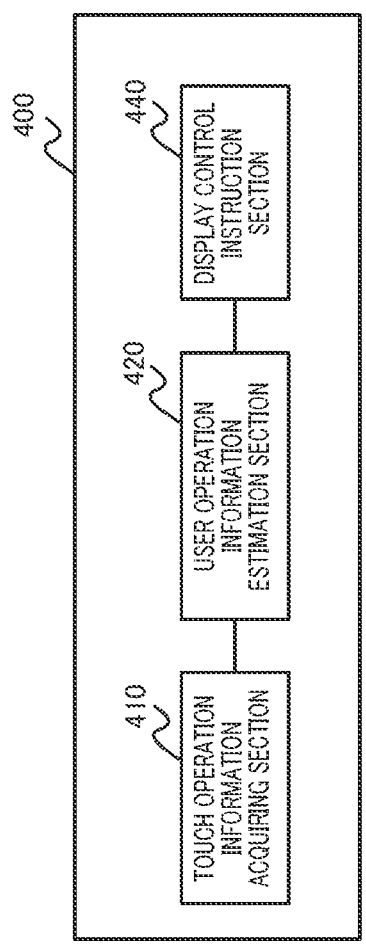
FIG. 1 is a block diagram illustrating an example of a configuration of a display control apparatus according to Embodiment 1 of the present invention.

FIG. 1 is a block diagram illustrating an example of a configuration of a display control apparatus according to the present embodiment.

In FIG. 1, display control apparatus 400 is an apparatus that performs display control on a touch-panel-incorporated display panel (not shown), and includes touch operation information acquiring section (sensor information acquiring section) 410, user operation information estimation section 420, and display control instruction section 440.

Touch operation information acquiring section 410 acquires touch operation information (sensor information).

User operation information estimation section 420 estimates a region of interest of a user (hereinafter, referred to as "target region") from a display region of a display panel based on the acquired touch operation information.

Display control instruction section 440 sets a brightness level of a region of the display region other than the estimated target region (hereinafter, referred to as "non-target region") to be lower than a set brightness level.

Display control apparatus 400 includes, for example, a CPU (central processing unit), a storage medium that stores a control program such as ROM (read only memory) and a working memory such as RAM (random access memory), which are not shown. In this case, the above-described functions of the respective sections are implemented by the CPU executing a control program.

Such display control apparatus 400 can estimate a target region of a display region from touch operation information of a touch panel and reduce a brightness level of a non-target region. This allows display control apparatus 400 to effectively reduce power consumption while securing viewability of the display region.

(Embodiment 2)

Embodiment 2 of the present invention is an example of a more specific mode of a case where the present invention is applied to a display apparatus provided with a touch-panel-incorporated display panel.

<Configuration of Display Apparatus>

First, a configuration of a display apparatus including a display control apparatus according to the present embodiment will be described.

Figure 2:
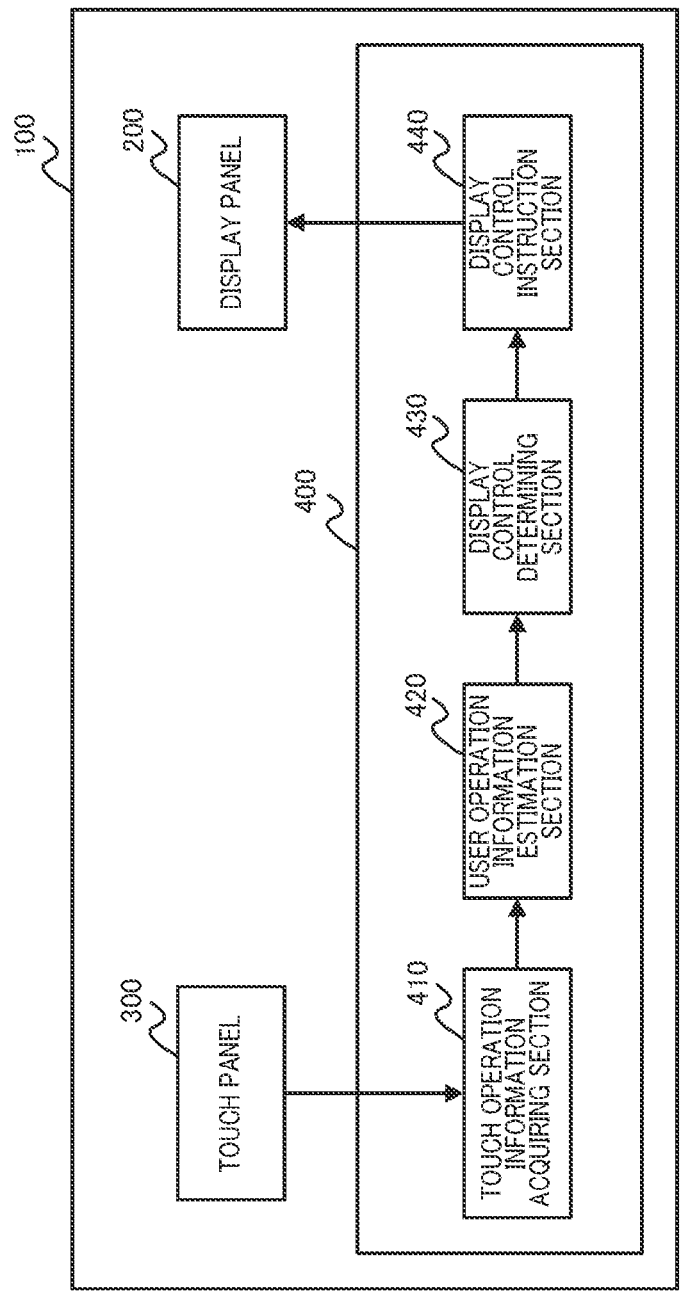
FIG. 2 is a block diagram illustrating an example of a configuration of a display apparatus including a display control apparatus according to Embodiment 2 of the present invention.

FIG. 2 is a block diagram illustrating an example of the configuration of the display apparatus including the display control apparatus according to the present embodiment.

Display apparatus 100 shown in FIG. 2 is a portable type electronic device including a mobile communication terminal such as a cellular phone, PDA (personal data assistant), digital camera, tablet, smartphone, and portable audio device, for example. Display apparatus 100 includes display panel (display section) 200, touch panel (sensor) 300, and display control apparatus 400.

Display panel 200 displays an image in a display region according to an image signal received from an image control section (not shown) of display apparatus 100. Note that display panel 200 can control the brightness level for each region obtained by dividing the display region of display panel 200 (e.g., for each pixel). More specifically, display panel 200 is, for example, organic EL display, LCD or LED display. Display panel 200 in the present embodiment will be described using an organic EL display as an example.

In the present embodiment, a brightness level is assumed to be a ratio of an actual brightness value to value 100 when the maximum brightness of an image displayed on display panel 200 is assumed to be 100. A set brightness level means a brightness level when display control apparatus 400 does not function. That is, the set brightness level is any one of the brightness level set beforehand by a user, brightness level set as a default value in display control instruction section 440 and brightness level of a target region, for example.

Touch panel 300 outputs information indicating contents of an operation conducted on touch panel 300 (hereinafter referred to as "touch operation information").

In the present embodiment, an assumption is made that touch panel 300 is provided in a display region of display panel 200 (hereinafter simply referred to as "display region"). Touch panel 300 outputs a detection signal indicating at which position contact is sensed (hereinafter referred to as "touch operation signal" (sensor signal)) as the touch operation information.

Display control apparatus 400 is an apparatus that performs display control (that is, display control on display panel 200) of display apparatus 100. Display control apparatus 400 includes touch operation information acquiring section 410, user operation information estimation section 420, display control determining section 430, and display control instruction section 440.

Touch operation information acquiring section 410 acquires touch operation information from touch panel 300.

More specifically, touch operation information acquiring section 410 receives a touch operation signal outputted from touch panel 300 as input and converts a position at which contact is sensed to information indicating the position using coordinates of a display region displayed by display panel 200 (hereinafter referred to as "contact point information").

Touch operation information acquiring section 410 outputs the acquired contact point information to user operation information estimation section 420.

User operation information estimation section 420 estimates a target region from the display region based on the acquired touch operation information. In other words, user operation information estimation section 420 estimates a region of the display region other than the estimated target region or a display region of display panel 200 which is not interest of the user as a non-target region.

More specifically, user operation information estimation section 420 acquires a region of the display region where the user is touching with a finger (hereinafter referred to as "touch region") from the contact point information received from touch operation information acquiring section 410. User operation information estimation section 420 then estimates a target region from the acquired touch region.

User operation information estimation section 420 outputs information indicating the estimated target region (in other words, information indicating the estimated non-target region) (hereinafter referred to as "region information") to display control determining section 430.

Display control determining section 430 determines a brightness level of each region of the display region according to whether the region is a target region or a non-target region.

More specifically, display control determining section 430 determines a brightness level of each region of the display region based on the region information inputted from user operation information estimation section 420 so that the non-target region has a brightness level lower than a set brightness level.

Display control determining section 430 outputs information indicating the determined brightness level of each region (hereinafter referred to as "brightness information") to display control instruction section 440.

Note that "determining the brightness level" is a concept including determining the ratio of the brightness level to be actually outputted to the set brightness level (output ratio with respect to the brightness value indicated by an image signal, hereinafter referred to as "level ratio"). That is, the brightness information is information specifying a level ratio. Setting a lower brightness level than the set brightness level includes a case where the level ratio outputted as brightness information has a value less than 1.

Display control instruction section 440 sets the brightness level of the non-target region to be lower than the set brightness level. More specifically, display control instruction section 440 outputs, to display apparatus 100 (that is, display panel 200), a control signal for instructing each region of the display region to be displayed at a determined brightness level based on brightness information received from display control determining section 430.

In the present embodiment, a control signal outputted from display control instruction section 440 is a signal for instructing each pixel of, for example, an organic EL to be outputted at the above-described level ratio.

Display apparatus 100 includes, for example, a CPU and a storage medium such as ROM that stores a control program and a working memory such as RAM, which are not shown. In this case, the above-described functions of the respective sections are implemented by the CPU executing a control program.

Such display apparatus 100 can estimate a target region of the display region from the user's operation on display panel 200 and lower the brightness level of the non-target region.

The non-target region is a so-called region not viewable or unnecessary to the user. For this reason, even when the brightness level of the display of the non-target region is lowered, comfort with which the user views the display region is hardly lost. Thus, display apparatus 100 can effectively reduce power consumption while securing viewability of the display region.

The description of the configuration of display apparatus 100 has been given thus far.

<Operation of Display Apparatus>

Next, operation of display apparatus 100 will be described.

Figure 3:
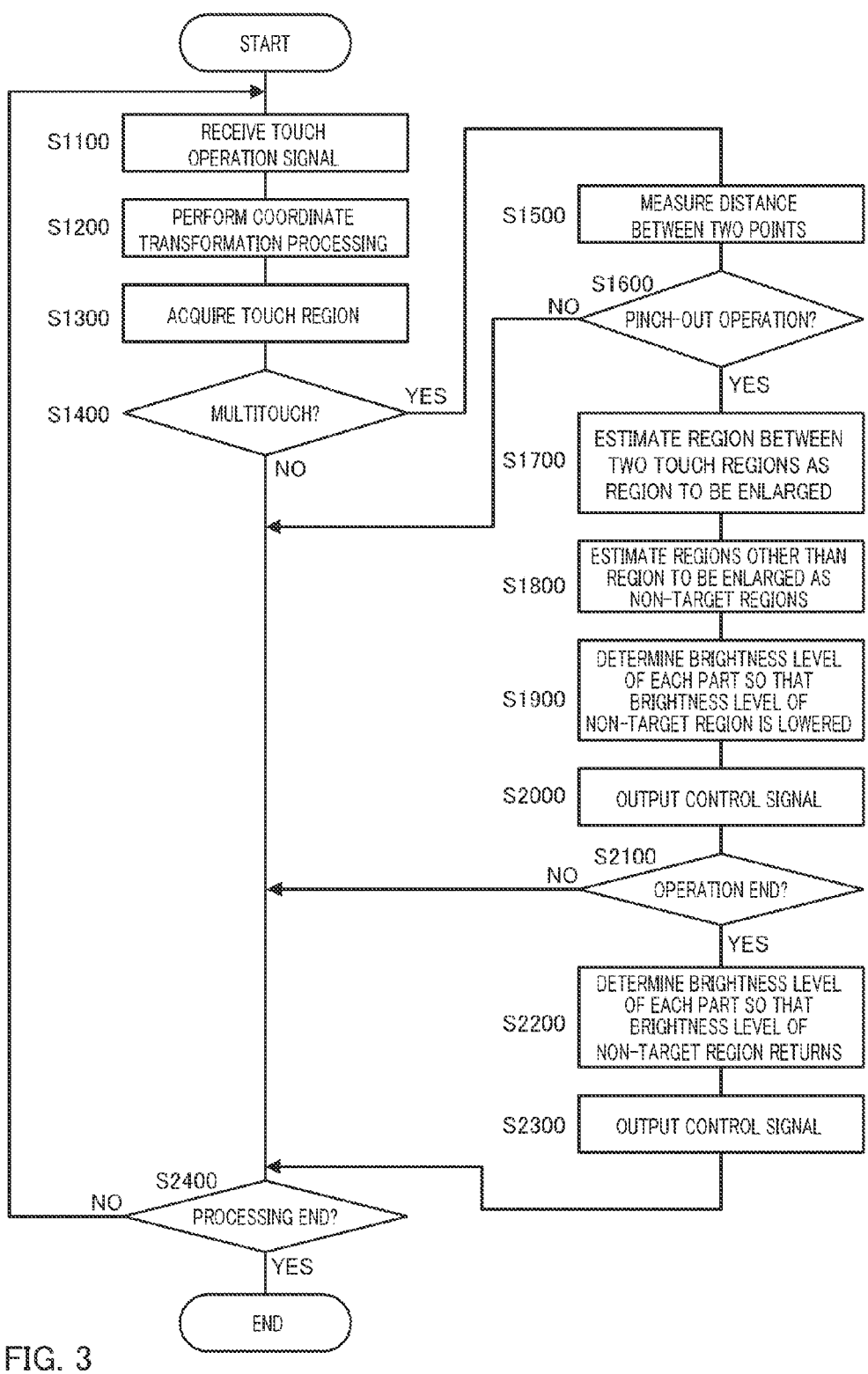
FIG. 3 is a flowchart illustrating an example of operation of the display apparatus according to Embodiment 2 of the present invention.

FIG. 3 is a flowchart illustrating an example of operation of display apparatus 100.

First, in step S1100, touch operation information acquiring section 410 receives a touch operation signal from touch panel 300.

In step S1200, touch operation information acquiring section 410 converts the touch operation signal to contact point information through coordinate transformation processing.

In step S1300, user operation information estimation section 420 acquires a touch region from the contact point information.

In the present embodiment, an assumption is made that user operation information estimation section 420 acquires each of regions having a predetermined or greater area of continuous closed regions from which contact is detected as a touch region.

For example, let us suppose that the user touches the touch panel with two fingers, the forefinger and thumb. In this case, the region where the forefinger contacts the touch panel and the region where the thumb contacts the touch panel are acquired as touch regions, respectively.

Such contact states are detected when, for example, the user attempts to perform an operation of displaying an enlarged view of an image in the region between the two fingers touching the display region (hereinafter referred to as "pinch-out operation" (enlarging operation)). Such a pinch-out operation includes touching the touch panel with two fingers, and sliding the two fingers to outside in such a way that the distance between the fingers expands.

User operation information estimation section 420 may substitute a region having a predetermined or greater area of the continuous closed region from which contact is detected with a region with a simple shape such as a circle of a predetermined size and acquire the substituted region as a touch region. In this case, the touch region can be simply defined by, for example, center coordinates and radius and the scale of area of the touch region can be simply determined by the radius. That is, the load of the subsequent processing can be reduced.

When no contact with the touch panel is detected, the coordinate transformation processing in step S1200 and the touch region acquiring processing in step S1300 are not particularly performed.

In step S1400, user operation information estimation section 420 determines from the acquired touch region, whether or not a multitouch state is in place. The "multitouch" here is a state in which there are two or more touch regions and, for example, a state in which two fingers are touching the touch panel.

When a multitouch state is in place (S1400: YES), user operation information estimation section 420 moves to step S1500. When a multitouch state is not in place (S1400: NO), user operation information estimation section 420 moves to step S2400 which will be described later.

In step S1500, user operation information estimation section 420 assumes the regions having the largest area and the second largest area of the touch region as a first touch region and a second touch region, respectively. User operation information estimation section 420 then measures a distance between the first touch region and the second touch region (hereinafter referred to as "distance between two points"). The distance between two points is, for example, a distance between a point in the first touch region closest to the second touch region and a point in the second touch region closest to the first touch region.

In step S1600, user operation information estimation section 420 estimates whether or not the user is performing a pinch-out operation. In the case of a pinch-out operation, two fingers normally start to move from a position where the distance between two points is short and then slide. Therefore, based on, for example, whether or not the distance between the two points is equal to or less than a predetermined threshold, user operation information estimation section 420 estimates whether or not the user is performing a pinch-out operation.

When the user is performing a pinch-out operation (S1600: YES), user operation information estimation section 420 moves to step S1700. When the user is not performing a pinch-out operation (S1600: NO), user operation information estimation section 420 moves to step S2400 which will be described later.

In step S1700, user operation information estimation section 420 estimates the region between the first touch region and the second touch region as a region to be enlarged.

In step S1800, user operation information estimation section 420 estimates the region to be enlarged as a target region, estimates a region of the display region other than the region to be enlarged as a non-target region and moves to step S1900.

That is, upon determining that the user is performing a pinch-out operation, user operation information estimation section 420 estimates the region between a plurality of finger touch regions during a pinch-out operation as the target region.

Figure 4:
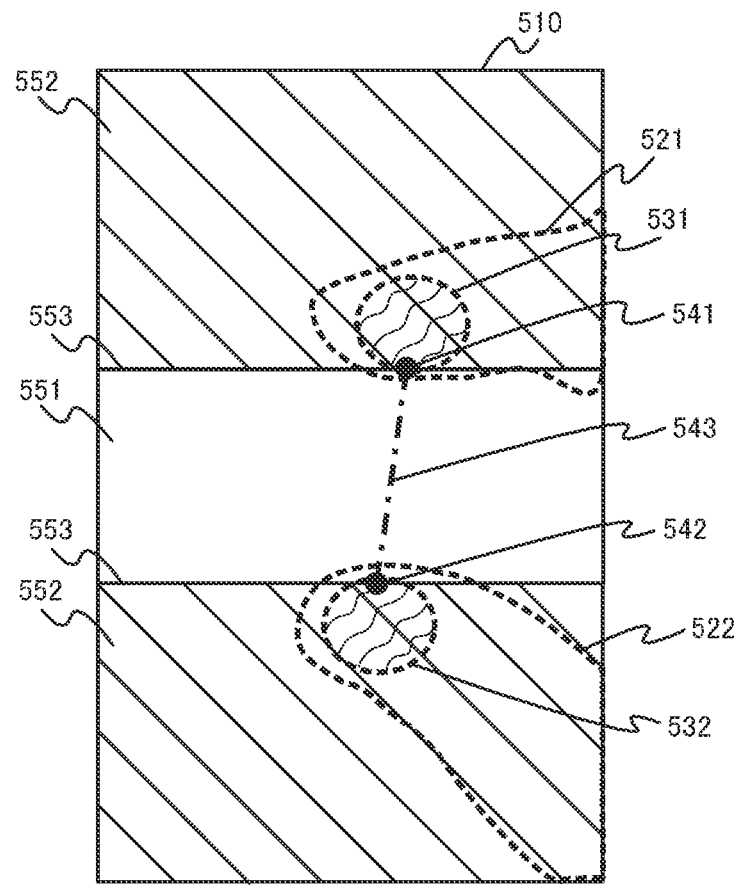
FIG. 4 illustrates an example of a touch region and a non-target region in Embodiment 2 of the present invention.

FIG. 4 illustrates an example of touch regions and a non-target region estimated based on the touch regions. Here, the user's fingers are shown by dotted lines together.

The example of display region 510 shown in FIG. 4 shows that forefinger 521 and thumb 522 are touching the display region. Here, an assumption is made that the region of forefinger 521 contacting display region 510 is first touch region 531 and the region of thumb 522 contacting display region 510 is second touch region 532. Let us suppose that a point of the first touch region closest to the second touch region is first point 541 and a point of the second touch region closest to the first touch region is second point 542. In this case, the distance between the two points is a length of line segment 543 connecting first point 541 and second point 542.

When the length of this line segment 543 is less than the predetermined threshold, user operation information estimation section 420 determines that the pinch-out operation is in progress (S1600: YES). User operation information estimation section 420 then assumes the region between first touch region 531 and second touch region 532 as target region 551 and assumes the other regions as non-target regions 552.

Here, a case is illustrated where non-target regions 552 are estimated in such a way that boundaries 553 between target region 551 and non-target regions 552 are straight lines parallel to a top end and a bottom end of display region 510. Such estimation is suitable for horizontally written text information, for example. Such an aspect of boundaries 553 is not limited to this.

Figure 5:
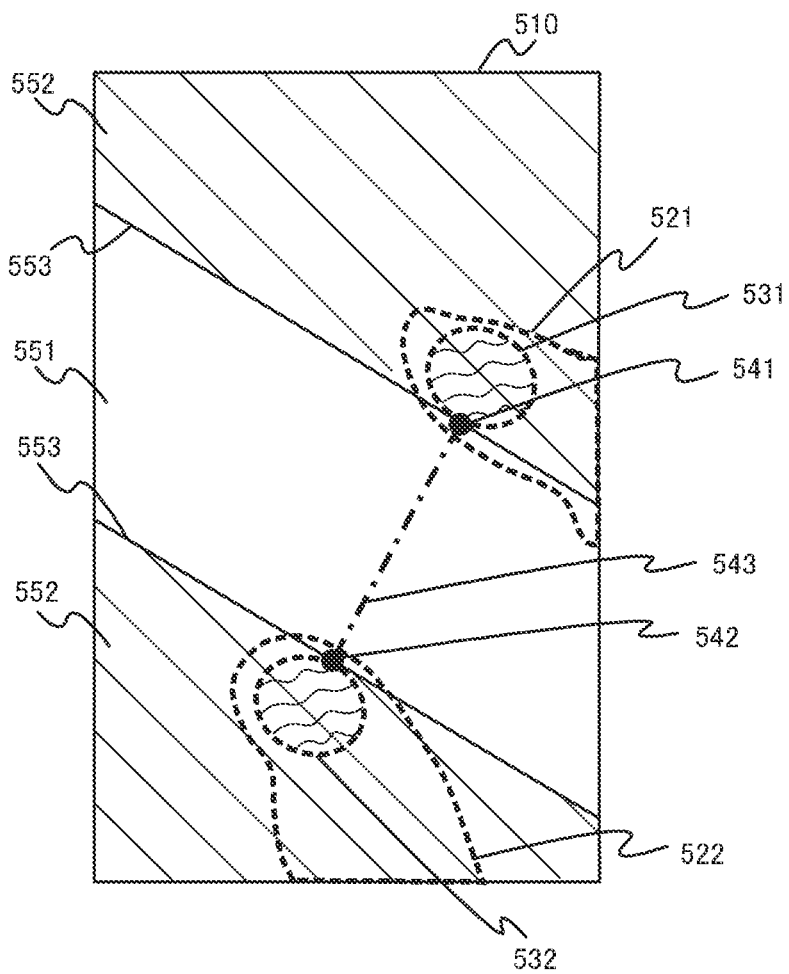
FIG. 5 illustrates another example of the touch region and non-target region in Embodiment 2 of the present invention.

FIG. 5 illustrates another example of the non-target regions, which corresponds to FIG. 4. Parts corresponding to those in FIG. 4 are assigned the same reference numerals and description thereof will be omitted.

As shown in FIG. 5, user operation information estimation section 420 estimates non-target regions 552, for example, in such a way that boundaries 553 between target region 551 and non-target region 552 become straight lines orthogonal to line segment 543 connecting first point 541 and second point 542.

Such estimation is suitable for an image such as a map. When a region to be enlarged is band-shaped, the user often performs multitouch as if the user nips this band-shaped region. The direction in which forefinger 521 and thumb 522 extend is substantially orthogonal to line segment 543. Therefore, such estimation allows estimation of a target region with still higher accuracy.

Note that boundaries 553 between target region 551 and non-target regions 552 need not always be straight lines, and for example, boundary 553 may be a circle, the diameter of which may be line segment 543 connecting first point 541 and second point 542. Boundaries 553 between target region 551 and non-target regions 552 may also be similar to display region 510 including first point 541 and second point 542 (here, rectangle) or the like.

In step S1900, display control determining section 430 determines a brightness level of each part so that the brightness level of the non-target regions becomes lower than a set reference level. More specifically, display control determining section 430 determines a level ratio of each part so that the brightness level of the non-target regions becomes lower than a set reference level.

For example, display control determining section 430 determines the level ratio of the target region to 1 and determines the level ratio of the touch region of the non-target regions to 0. Display control determining section 430 determines the level ratio of the remaining region other than the touch regions of the target region and the non-target regions (hereinafter referred to as "remaining region") in the display region to be 0.5. In this way, uniformly determining the brightness level for each region using the level ratio makes it possible to determine a brightness level of each part with a smaller processing load.

In step S2000, display control instruction section 440 generates a control signal to achieve the brightness level determined in step S1900 and outputs the control signal to display panel 200. The control signal has a content in which a level ratio is specified per region or per pixel, for example.

In step S2100, user operation information estimation section 420 determines whether or not the touch panel operation by the user has ended. The end of the touch panel operation is that, for example, the user who has been performing the pinch-out operation removes his/her two fingers from the touch panel, and this can be determined based on whether the area of the touch region becomes 0 or not.

When the touch panel operation by the user ends (S2100: YES), user operation information estimation section 420 moves to step S2200. When the touch panel operation by the user has not ended or the touch panel operation has not been performed from the beginning (S2100: NO), user operation information estimation section 420 moves to step S2400 which will be described later.

In step S2200, display control determining section 430 determines the brightness level of each part so that the brightness level of the non-target regions returns to the set brightness level.

For example, display control determining section 430 determines all level ratios of the target region and non-target regions (touch region and remaining region) to 1.

In step S2300, display control instruction section 440 generates a control signal to achieve the brightness level determined in step S2200 and outputs the control signal to display panel 200.

In step S2400, user operation information estimation section 420 determines whether or not an end of the processing is instructed through a user operation or the like. When the end of the processing has not been instructed (S2400: NO), user operation information estimation section 420 returns to step S1100. When the end of the processing has been instructed (S2400: YES), user operation information estimation section 420 ends a series of processes.

Through such an operation, display apparatus 100 can monitor the user's operation on display panel 200. When the user's operation is a pinch-out operation, display apparatus 100 successively estimates regions other than a region to be enlarged as non-target regions and can thereby lower the brightness level of the non-target regions.

Note that the user actually often places his/her fingers at an edge of a region to be enlarged, that is, inside the region to be enlarged. That is, the actual region to be enlarged is often a region including two touch regions. However, since the region where the finger is contacting is hidden by the fingers, the region is not viewable to the user. Therefore, as described above, even when the region between the two touch regions is estimated as a region to be enlarged and the regions where the fingers are contacting are estimated as the non-target regions, viewability of the display region is less likely to be lost.

Display apparatus 100 may also estimate a region including two touch regions as regions to be enlarged. In this case, display apparatus 100 may estimate a region between a point of the first touch region farthest from the second touch region and a point of the second touch region farthest from the first touch region as a region to be enlarged.

Display apparatus 100 may gradually lower the brightness level of the non-target region in accordance with the progress of a pinch-out operation or an elapsed time from the operation start.

When the operation ends, display apparatus 100 need not always return the brightness level to the original level.

As described above, display control apparatus 400 according to the present embodiment estimates the target region of the display region from the touch operation information of touch panel 300 and can thereby lower the brightness level of the non-target regions. Thus, display control apparatus 400 can effectively lower power consumption while securing viewability of the display region.

Note that there may be a case where display apparatus 100 uses an LCD or LED or the like and display apparatus 100 is provided with display control apparatus 400 as a backlight. In such case, display apparatus 100 may be configured to change the brightness level through display control instruction section 440. In this case, for example, display control instruction section 440 acquires an image signal inputted to display apparatus 100 and performs processing of changing the brightness level of each part in accordance with a determined level ratio. Display control instruction section 440 then inputs a processed image signal to display apparatus 100 as a substitute for the image signal.

(Embodiment 3)

Embodiment 3 of the present invention is an example of specific modes suitable when the display region is made up of a plurality of divided regions.

<Configuration of Display Apparatus>

Figure 6:
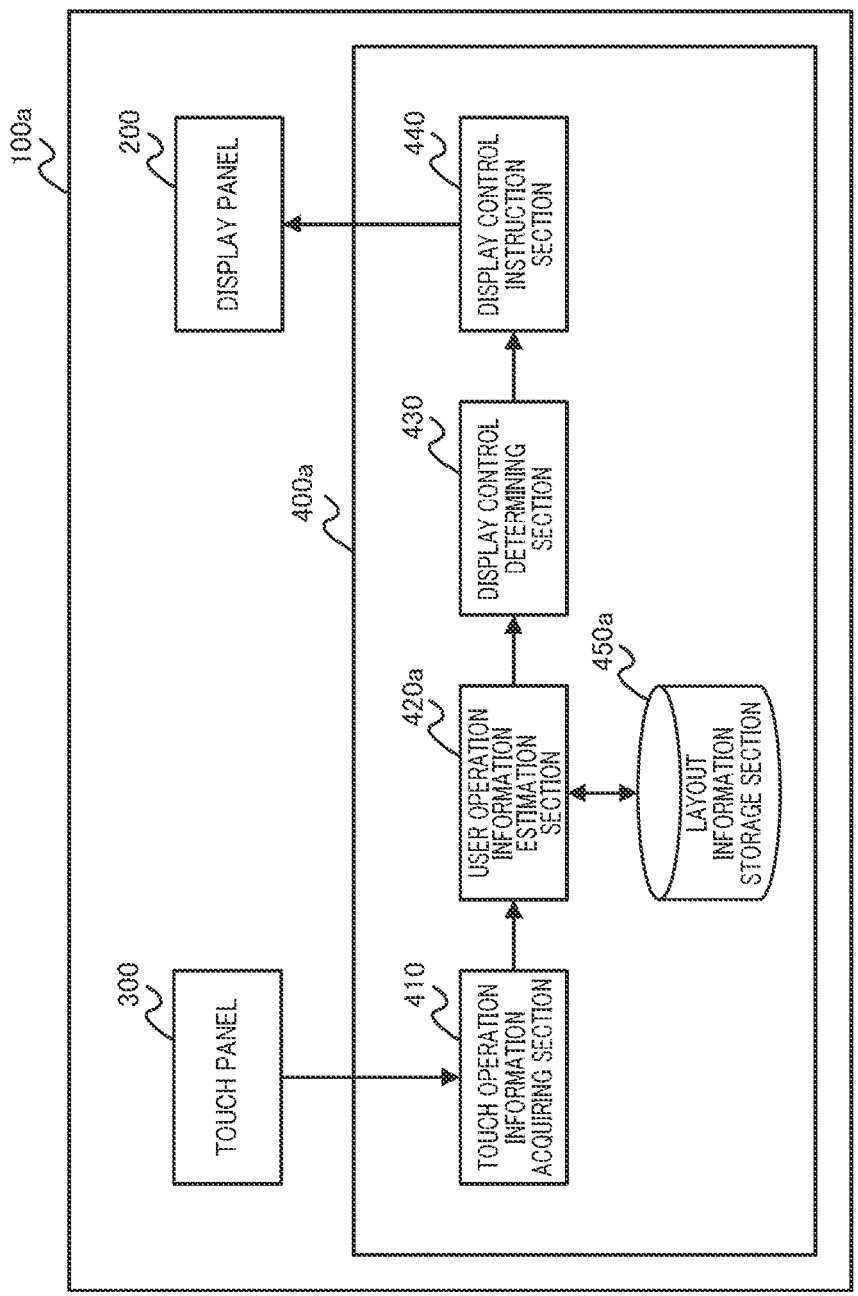
FIG. 6 is a block diagram illustrating an example of a configuration of a display apparatus including a display control apparatus according to Embodiment 3 of the present invention.

FIG. 6 is a block diagram illustrating an example of a configuration of a display apparatus including a display control apparatus according to the present embodiment, which corresponds to FIG. 2 of Embodiment 2. Parts identical to those in FIG. 2 are assigned the same reference numerals and description thereof will be omitted.

In FIG. 6, display control apparatus 400a of display apparatus 100a further includes layout information storage section 450a in addition to the configuration of FIG. 2. Display control apparatus 400a includes user operation information estimation section 420a instead of user operation information estimation section 420 of FIG. 2.

Layout information storage section 450a stores layout information indicating a layout of divided regions obtained by dividing a display region displayed by display panel 200. The layout of the divided regions is defined by relative coordinates of the divided regions with respect to the entire display region, for example. The layout information is acquired, for example, by an image analysis section (not shown) analyzing an image signal or signal added to an image signal or accessing a server that delivers an image signal.

<Configuration of Display Region>

Figure 7:
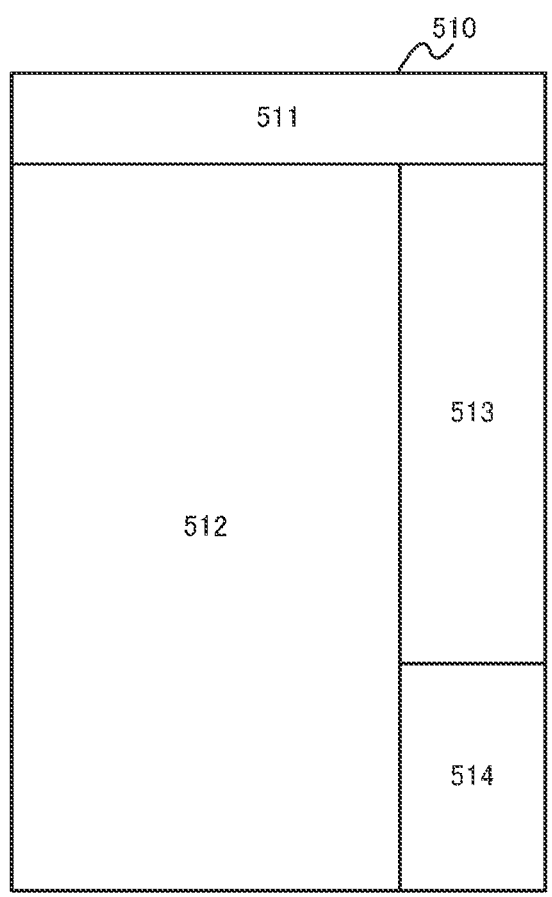
FIG. 7 illustrates an example of a configuration of a display region formed of a plurality of divided regions according to Embodiment 3 of the present invention.

FIG. 7 illustrates an example of a configuration of the display region formed of a plurality of divided regions.

As shown in FIG. 7, display region 510 is composed of, for example, four divided regions: first to fourth divided region 511 to 514. Let us suppose that display region 510 is a web page displayed by a web browser. First divided region 511 is, for example, a region that displays a title of the web page. Second divided region 512 is, for example, a region that displays a main region of the web page. Third divided region 513 is, for example, a region that displays information on a table of contents. Fourth divided region 514 is, for example, a region that displays an advertisement.

User operation information estimation section 420a in FIG. 6 estimates a target region using each of the divided regions as a unit. More specifically, upon determining that the user is performing a pinch-out operation, user operation information estimation section 420a estimates a region between touch regions of a plurality of fingers out of the divided regions in which the pinch-out operation is in progress as a target region. In other words, user operation information estimation section 420a refers to the layout information stored in layout information storage section 450a and assumes the divided regions not including the line segment connecting the touch regions of the two fingers in the pinch-out operation as a non-target regions.

More specifically, for divided regions including at least part of the line segment connecting the above-described first and second points, user operation information estimation section 420a determines the target region and non-target regions as in the case of Embodiment 2. User operation information estimation section 420a determines the divided regions not including the line segment connecting the above-described first and second points as non-target regions.

<Operation of Display Apparatus>

Figure 8:
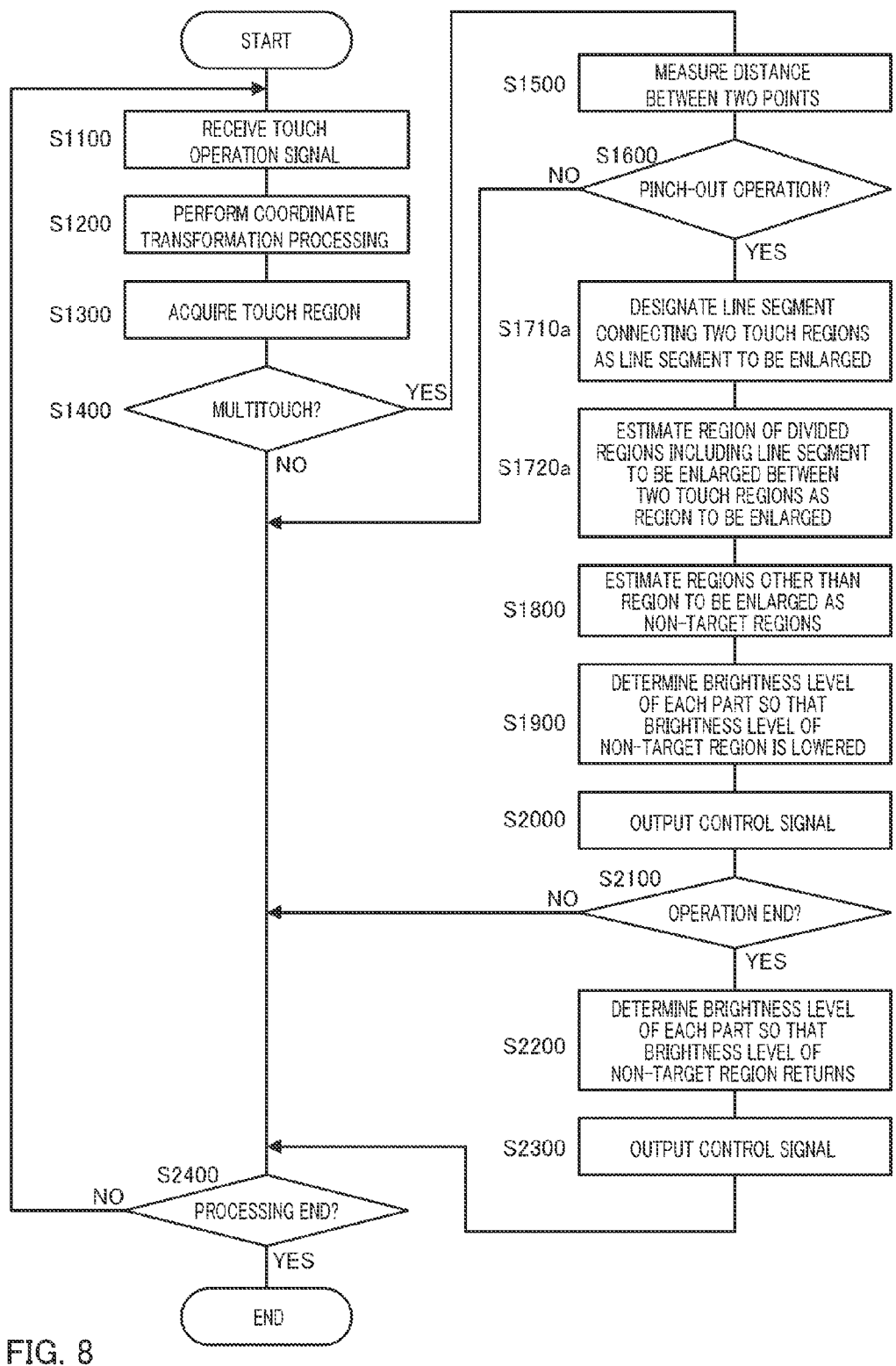
FIG. 8 is a flowchart illustrating an example of operation of the display apparatus according to Embodiment 3 of the present invention.

FIG. 8 is a flowchart illustrating an example of operation of display apparatus 100a, which corresponds to FIG. 3 of Embodiment 1. Parts identical to those in FIG. 3 are assigned the same reference numerals and description thereof will be omitted.

When the user is performing a pinch-out operation (S1600: YES), user operation information estimation section 420*a* moves to step S1710*a*.

In step S1710*a*, user operation information estimation section 420*a* acquires the line segment connecting the first touch region and the second touch region as a line segment to be enlarged.

In step S1720*a*, user operation information estimation section 420*a* estimates, with reference to layout information, a region of the divided regions including at least part of the line segment to be enlarged between the two touch regions as a region to be enlarged.

User operation information estimation section 420*a* then moves to step S1800. That is, user operation information estimation section 420*a* excludes the region not including the line segment to be enlarged from the estimation target of the region to be enlarged.

<Touch Region and Non-Target Region>

Figure 9:
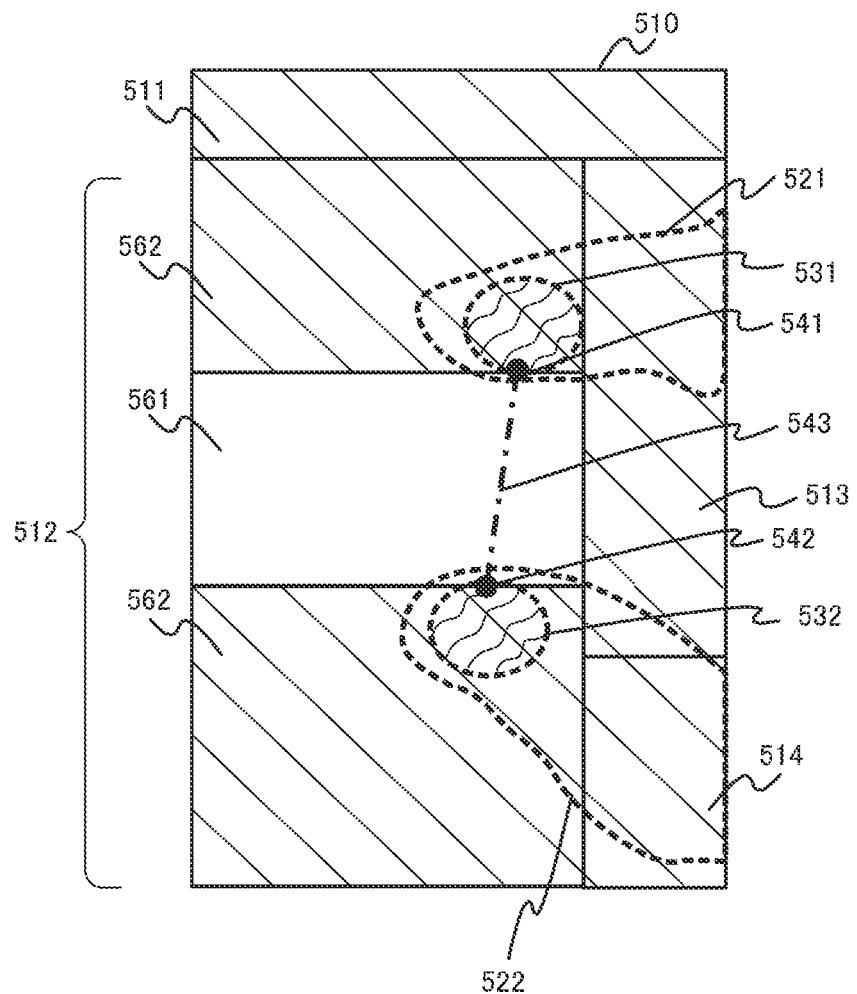
FIG. 9 illustrates an example of a touch region and a non-target region according to Embodiment 3 of the present invention.

FIG. 9 illustrates an example of touch regions and non-target regions, which corresponds to FIG. 7 and FIG. 4 of Embodiment 1. Parts corresponding to those in FIG. 7 and FIG. 4 are assigned the same reference numerals and description thereof will be omitted.

As shown in FIG. 9, suppose line segment (line segment to be enlarged) 543 connecting first point 541 and second point 542 is included in second divided region 512. In this case, user operation information estimation section 420*a* assumes region 561 of second divided region 512 between first touch region 531 and second touch region 532 as a target region.

User operation information estimation section 420*a* assumes regions 562 of second divided region 512 other than region 561 as non-target regions. User operation information estimation section 420*a* assumes first, third and fourth divided regions 511, 513 and 514 as non-target regions.

As a result, only region 561 of second divided region 512 has a set brightness level and other regions have lower brightness levels.

When FIG. 9 is compared with FIG. 4, the non-target region in FIG. 9 has a greater area by a portion corresponding to the right side region (part of third divided region 513) of region 561, which clearly shows that a high power-saving effect is achieved.

Thus, display apparatus 100*a* according to the present embodiment assumes the divided regions not including the line segment to be enlarged in a pinch-out operation as non-target regions.

In the case of a screen such as a web page where each divided region has complete information, the user normally does not watch regions other than the divided region subject to a pinch-out operation. Therefore, lowering the brightness level of the divided regions not including the line segment to be enlarged is less likely to impair the comfort for the user viewing the screen. That is, display apparatus 100*a* can more effectively lower power consumption while securing viewability of the display region.

Note that in Embodiment 2 and Embodiment 3 of the present invention described so far, only the pinch-out operation is assumed to be a target for estimation of non-target regions and a reduction of the brightness level, but the target for estimation of non-target regions and a reduction of the brightness level is not limited to this.

For example, the display control apparatus according to the present invention may also designate a pinch-in operation that displays a reduced view of an image or a flick operation that slides a screen vertically and horizontally as a target for estimation of non-target regions and a reduction of the brightness level. In the latter case, the display control apparatus designates a region which, for example, disappears from a display range by sliding the screen as non-target regions.

(Embodiment 4)

Embodiment 4 of the present invention is an example of a specific mode when a region hidden by the user's fingers is taken into consideration.

<Configuration of Display Apparatus>

Figure 10:
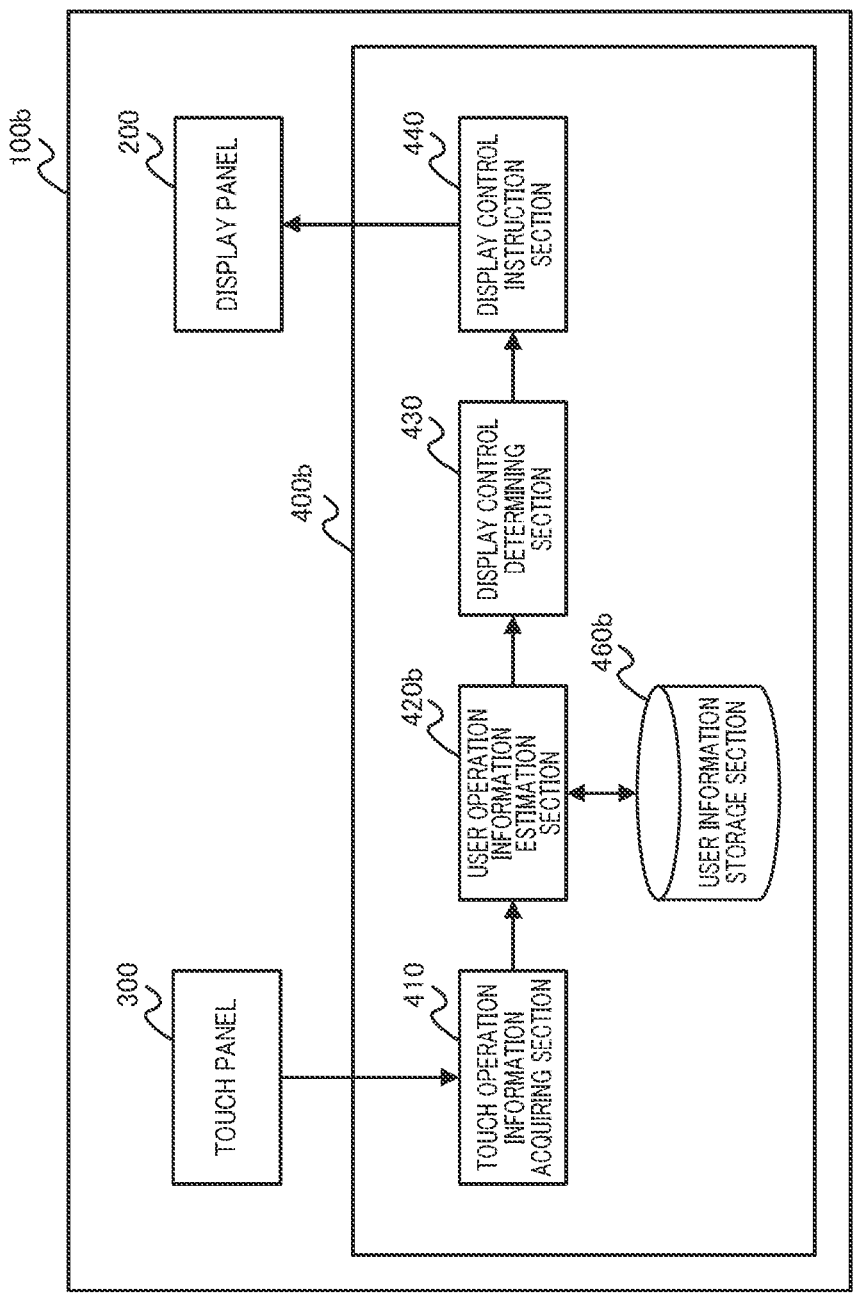
FIG. 10 is a block diagram illustrating an example of a configuration of a display apparatus including a display control apparatus according to Embodiment 4 of the present invention.

FIG. 10 is a block diagram illustrating an example of a configuration of a display apparatus including a display control apparatus according to the present embodiment, which corresponds to FIG. 2 of Embodiment 2. Parts identical to those in FIG. 2 are assigned the same reference numerals and description thereof will be omitted.

In FIG. 10, display control apparatus 400*b* of display apparatus 100*b* further includes user information storage section 460*b* in addition to the configuration of FIG. 2. Display control apparatus 400*b* includes user operation information estimation section 420*b* instead of user operation information estimation section 420 of FIG. 2.

User information storage section 460*b* stores user information indicating information relating to a finger position during an operation by the user.

In the present embodiment, the user information is information indicating whether the user is right-handed or left-handed and is assumed to be set beforehand, for example, through an operation by the user.

User operation information estimation section 420*b* estimates a region hidden by a user's finger (hereinafter referred to as "hidden region") using the user information stored in user information storage section 460*b*. User operation information estimation section 420*b* then designates the estimated hidden region as a non-target region.

An assumption is made that user operation information estimation section 420*b* stores an estimation rule for estimating the hidden region from the user information beforehand.

In the present embodiment, when the user is right-handed, the estimation rule is assumed to include a rule that a touch region and a region away from a right end point of the touch region in the rightward direction by a predetermined distance or more as hidden regions. On the other hand, when the user is left-handed, the estimation rule is assumed to include a rule that a touch region and a region away from a left end point of the touch region in the leftward direction by a predetermined distance or more as hidden regions.

A right-handed user normally holds display apparatus 100*b* by the left hand and performs a touch panel operation by the right hand. For this reason, in the case of a right-handed user, most of the region slightly distanced rightward from the touch region of the finger is hidden by the back of the right hand.

On the other hand, a left-handed user normally holds display apparatus 100*b* by the left hand and performs a touch panel operation by the left hand. For this reason, in the case of a left-handed user, most of the region slightly distanced leftward from the touch region of the finger is hidden by the back of the left hand.

Therefore, the estimation rule used by user operation information estimation section 420*b* has the above-described rules. That is, user operation information estimation section 420*b* can estimate the hidden region accurately using the above-described user information and estimation rule.

<Operation of Display Apparatus>

Figure 11:
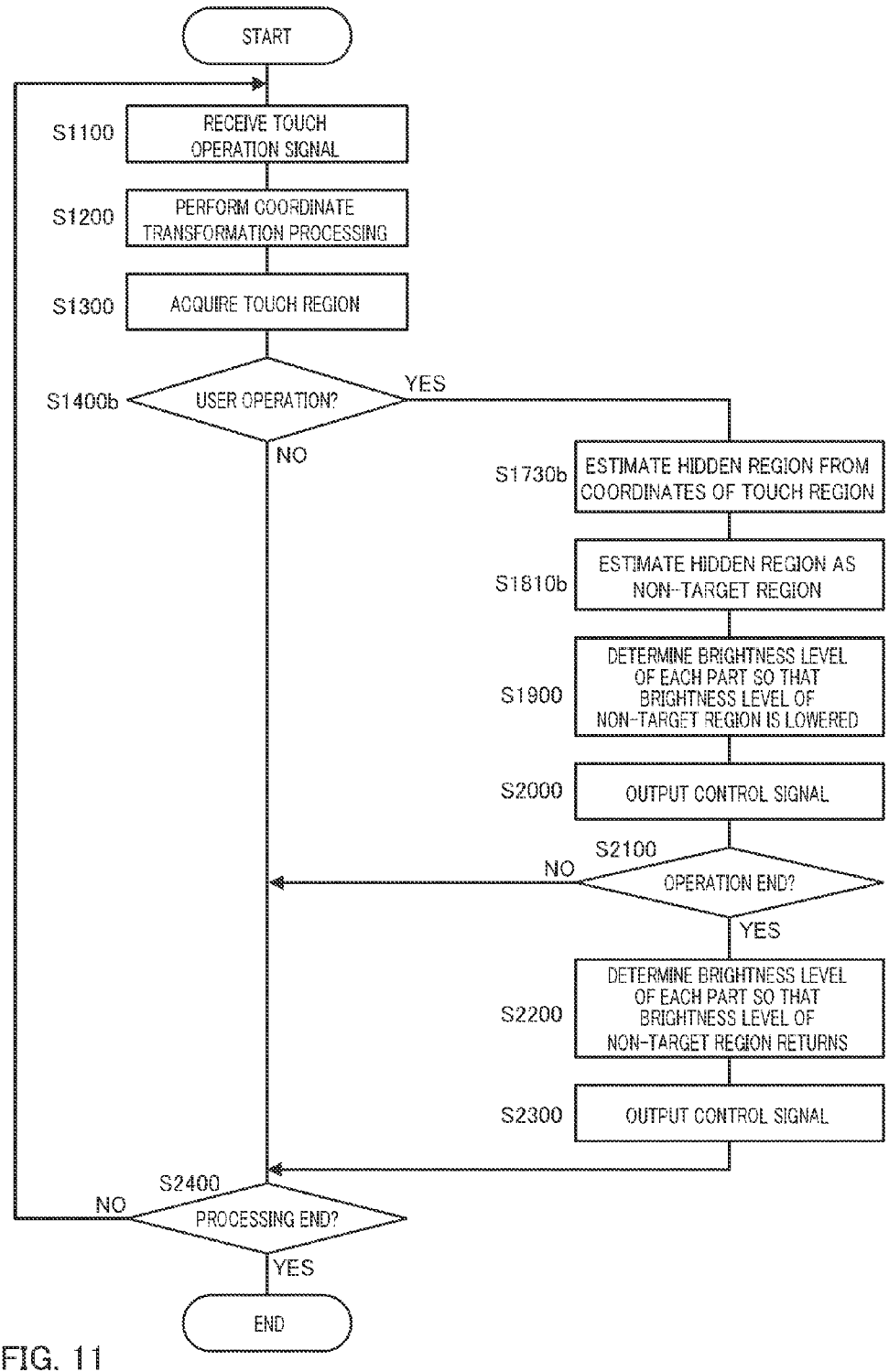
FIG. 11 is a flowchart illustrating an example of operation of the display apparatus according to Embodiment 4 of the present invention.

FIG. 11 is a flowchart illustrating an example of operation of display apparatus 100b, which corresponds to FIG. 3 of Embodiment 1. Parts identical to those in FIG. 3 are assigned the same reference numerals and description thereof will be omitted.

User operation information estimation section 420b determines whether or not the user is performing an operation. When the user is not performing an operation (S1400b: NO), user operation information estimation section 420b moves to step S2400. On the other hand, when the user is performing an operation (S1400b: YES), user operation information estimation section 420b moves to step S1730b.

In step S1730b, user operation information estimation section 420b refers to user information and estimates a hidden region from coordinates of the touch region based on the above-described estimation rule.

In step S1810b, user operation information estimation section 420b estimates the hidden region as a non-target region, estimates regions of the display region other than the non-target region as a target region and moves to step S1900.

<Touch Region and Non-Target Region>

Figure 12:
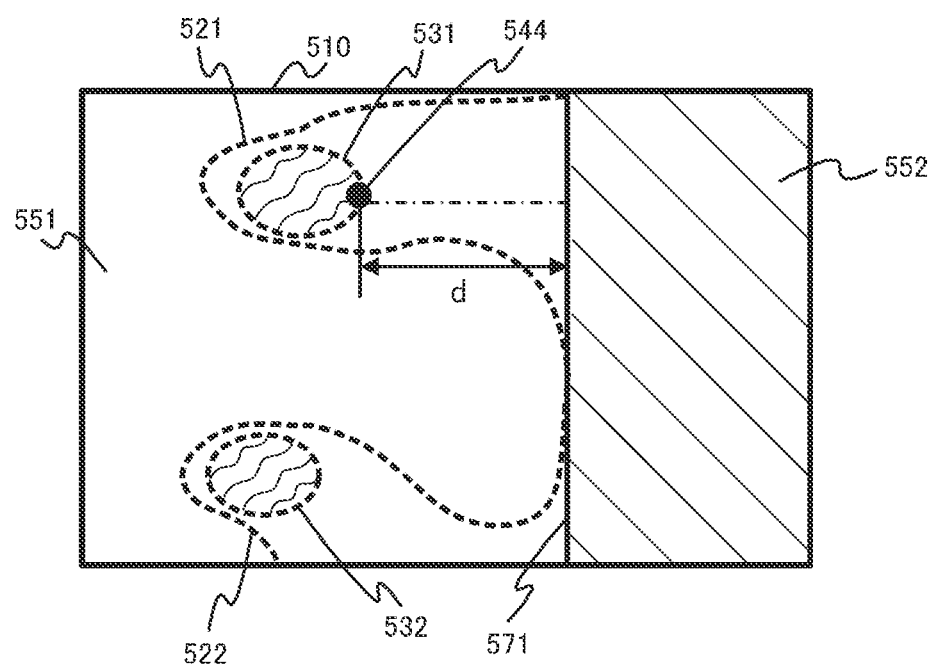
FIG. 12 illustrates an example of a touch region and non-target region according to Embodiment 4 of the present invention.

FIG. 12 illustrates an example of the touch region and non-target region, which corresponds to FIG. 4 of Embodiment 1. Parts corresponding to those in FIG. 4 are assigned the same reference numerals and description thereof will be omitted.

Here, a case will be described where user information indicating that the user is right-handed is stored.

As shown in FIG. 12, for example, user operation information estimation section 420b sets line 571 at predetermined distance d to the right from right end point 544 of first touch region 531 and second touch region 532 as a whole. User operation information estimation section 420b then designates the region on the left side of line 571 as target region 551 and the region on the right side of line 571 as a hidden region and non-target region 552. This non-target region 552 is a portion covered with, for example, the back of the right hand as shown in FIG. 12.

Thus, display apparatus 100b according to the present embodiment estimates a hidden part, designates the estimated hidden part as a non-target region and reduces the brightness level thereof. Thus, even when no pinch-out operation is performed, display apparatus 100b can effectively reduce power consumption while securing viewability of the display region.

Note that display apparatus 100b may also estimate a hidden region with fingers from the touch region with higher accuracy. In this case, display apparatus 100b estimates the shape of the fingers based on the arrangement of the touch region and may designate the region covered with the estimated shape as the hidden region. In this case, display apparatus 100b may estimate, for each touch region, which finger is used to form the touch region from the shape, size and position thereof or the like and select the best from shape patterns of fingers stored beforehand.

However, as described above, display apparatus 100b can reduce the processing load and more quickly lower the brightness level using the technique of estimating the touch region simply from the position of the hidden region.

Display apparatus 100b may also use a combination of the technique of estimating regions other than the region to be enlarged as non-target regions and the technique of estimating divided regions not including a line segment to be enlarged as non-target regions described in Embodiment 2 and Embodiment 3.

Embodiment 2 to Embodiment 4 of the present invention have been described with an example where a target region is estimated based on the touch panel touch operation information, but the target region estimation technique is not limited to this.

For example, the display control apparatus according to the present invention may acquire a video captured using a camera, detect the direction of a line of sight of the user from the acquired video and estimate regions other than the region on which the user is gazing as non-target regions.

That is, the display control apparatus may acquire information indicating a situation around the display region from a sensor that detects a situation around the display region by applying some scientific principles such as sensor information of an illumination sensor or the like. The display control apparatus may estimate a target region of the display region based on the acquired information indicating the situation around the display region. The information indicating the situation around the display region may include, for example, natural phenomenon, mechanical, electromagnetic, thermal, acoustic, chemical nature of artifact or spatial information or time information indicated by the information.

The relationship between a touch region or operation type and a non-target region (hidden region) may differ depending on an environment in which the display control apparatus is used, for each user, for each image displayed, for each application by which an image is displayed, or for each display panel, for example. In this case, it is preferable that the display control apparatus according to each embodiment described above store a plurality of estimation rules for estimating a hidden region from touch operation information, layout information and user information and select an estimation rule that best meets an environment in which the apparatus is used.

A display control apparatus according to this disclosure is a display control apparatus that performs display control on a touch-panel-incorporated display panel, the display control apparatus including: a touch operation information acquiring section that acquires touch operation information from the touch panel; a user operation information estimation section that estimates a target region from a display region of the display panel based on the acquired touch operation information, the target region being a region of interest of a user; and a display control instruction section that sets a brightness level of a non-target region to be lower than a set brightness level, the non-target region being a region other than the target region estimated in the display region.

In the display control apparatus according to this disclosure, the set brightness level may be any one of a brightness level set beforehand by the user, a brightness level set as a default value in the display control instruction section and a brightness level of the target region.

In the display control apparatus according to this disclosure, upon determining that the user is performing a pinch-out operation, the user operation information estimation section may estimate a region between a plurality of finger touch regions where the user is performing the pinch-out operation, as the target region.

The display control apparatus to this disclosure may further include a layout information storage section that stores layout information indicating a layout of divided regions resulting from division of the display region, in which the user operation information estimation section may estimate the target region in units of the divided regions with reference to the layout information.

In the display control apparatus according to this disclosure, the user operation information estimation section may estimate, upon determining that the user is performing a pinch-out operation, a region between the plurality of finger touch regions in the divided region where the user is performing the pinch-out operation, as the target region.

The display control apparatus according to this disclosure may further include a user information storage section that stores user information indicating information relating to a finger position during operation by the user, in which the user operation information estimation section may estimate a hidden region using the user information and estimate the estimated hidden region as the non-target region, the hidden region being a region hidden by a finger of the user.

A display control method according to this disclosure is a method for performing display control on a touch-panel-incorporated display panel, the method including: acquiring touch operation information from the touch panel; estimating a target region from a display region of the display panel based on the acquired touch operation information, the target region being a region of interest of a user; and setting a brightness level of a non-target region to be lower than a set brightness level, the non-target region being a region other than the target region estimated in the display region.

A display control program according to this disclosure is a program that causes a computer that performs display control on a touch-panel-incorporated display panel to function as: a touch operation information acquiring section that acquires touch operation information from the touch panel; a user operation information estimation section that estimates a target region from a display region of the display panel based on the acquired touch operation information, the target region being a region of interest of a user; and a display control instruction section that sets a brightness level of a non-target region to be lower than a set brightness level, the non-target region being a region other than the target region estimated in the display region.

The disclosure of Japanese Patent Application No. 2011-260186, filed on Nov. 29, 2011, including the specification, drawings, and abstract, is incorporated herein by reference in its entirety.

INDUSTRIAL APPLICABILITY

The present invention is useful as a display control apparatus, a display control method, and a display control program capable of effectively reducing power consumption while securing viewability of a display region. That is, the present invention includes a function of providing a user with low-power and high-quality display information and is suitable for all electronic devices having a display apparatus, and particularly for battery-driven portable terminals.

REFERENCE SIGNS LIST 100, 100a, 100b Display apparatus
200 Display panel
300 Touch panel
400, 400a, 400b Display control apparatus
410 Touch operation information acquiring section
420, 420a, 420b User operation information estimation section
430 Display control determining section
440 Display control instruction section
450a Layout information storage section
460b User information storage section

The invention claimed is:

1. A display control apparatus that performs display control on a touch-panel-incorporated display panel, the display control apparatus comprising:
a processor and a memory, the processor being configured to:
store in the memory user information indicating whether the user is right-handed or left-handed;
acquire touch operation information from the touch panel;
determine whether or not the user is performing a pinch-out operation by using the user's hand based on the acquired touch operation information;
estimate, upon determining that the user is performing a pinch-out operation, a region between a plurality of finger touch regions where the user is performing the pinch-out operation in a display region of the display panel as a target region which is a region of interest of the user;
set a brightness level of a non-target region to be lower than a set brightness level, the non-target region being a region other than the target region estimated in the display region, wherein the user is determined to be performing the pinch-out operation when a distance between a first touch region and a second touch region is less than a predetermined threshold, wherein the distance is measured between a first point and a second point, the first point is a point of the first touch region closest to the second touch region and a second point is a point of the second touch region closest to the first touch region;
estimate, a region between the first touch region and the second touch region as the target region, the first touch region being a region having a largest area in the touch regions indicated by the touch operation information, the second touch region being a region having a second largest area in the touch regions;
estimate a touch region and a region away from a right end point of the corresponding touch region in a rightward direction by a predetermined distance or more as hidden regions that are hidden by the user's hand when the user is right-handed;
estimate a touch region and a region away from a left end point of the corresponding touch region in a leftward direction by a predetermined distance or more as the hidden regions when the user is left-handed; and
designate the estimated hidden regions as the non-target region.

2. The display control apparatus according to claim 1, wherein the set brightness level is any one of a brightness level set beforehand by the user, a brightness level set as a default value, and a brightness level of the target region.

3. The display control apparatus according to claim 1, wherein the processor is further configured to store layout information indicating a layout of divided regions resulting from division of the display region, wherein
the target region is estimated in units of the divided regions with reference to the layout information.

4. The display control apparatus according to claim 3, wherein upon determining that the user is performing a pinch-out operation, a region between the plurality of finger touch regions in the divided region where the user is performing the pinch-out operation is estimated as the target region.

5. The display control apparatus according to claim 1, wherein the processor is further configured to store user information indicating information relating to a finger position during operation by the user, wherein a hidden region is estimated using the user information and the estimated hidden region is estimated as the non-target region, the hidden region being a region hidden by a finger of the user.

6. A display control method of performing display control on a touch-panel-incorporated display panel, the display control method comprising:

storing user information indicating whether a user is right-handed or left-handed;

acquiring touch operation information from the touch panel;

determining whether or not the user is performing a pinch-out operation by using the user's hand based on the acquired touch operation information;

estimating, upon determining that the user is performing a pinch-out operation, a region between a plurality of finger touch regions where the user is performing the pinch-out operation in a display region of the display panel, as a target region which is a region of interest of the user;

setting a brightness level of a non-target region to be lower than a set brightness level, the non-target region being a region other than the target region estimated in the display region, wherein the estimation of the target region includes determining that the user is performing the pinch-out operation when a distance between a first touch region and a second touch region is less than a predetermined threshold, and wherein the distance is measured between a first point and a second point, the first point is a point of the first touch region closest to the second touch region and a second point is a point of the second touch region closest to the first touch region;

estimating a region between the first touch region and the second touch region as the target region, the first touch region being a region having a largest area in the touch regions indicated by the touch operation information, the second touch region being a region having a second largest area in the touch regions;

estimating a touch region and a region away from a right end point of the corresponding touch region in a rightward direction by a predetermined distance or more as hidden regions that are hidden by the user's hand when the user is right-handed;

estimating a touch region and a region away from a left end point of the corresponding touch region in a leftward direction by a predetermined distance or more as the hidden regions when the user is left-handed; and designating the estimated hidden regions as the non-target region.

7. A non-transitory computer-readable medium storing a display control program that, when executed, causes a computer that performs display control on a touch-panel-incorporated display panel to:

store user information indicating whether a user is right-handed or left-handed;

acquire touch operation information from the touch panel;

determine whether or not the user is performing a pinch-out operation by using the user's hand based on the acquired touch operation information;

estimate, upon determining that the user is performing a pinch-out operation, a region between a plurality of finger touch regions where the user is performing the pinch-out operation in a display region of the display panel as a target region which is a region of interest of the user;

set a brightness level of a non-target region to be lower than a set brightness level, the non-target region being a region other than the target region estimated in the display region, wherein the estimation of the target region determines that the user is performing the pinch-out operation when a distance between a first touch region and a second touch region is less than a predetermined threshold, and wherein the distance is measured between a first point and a second point, the first point is a point of the first touch region closet to the second touch region and a second point is a point of the second touch region closest to the first touch region;

estimate a region between the first touch region and the second touch region as the target region, the first touch region being a region having a largest area in the touch regions indicated by the touch operation information, the second touch region being a region having a second largest area in the touch regions;

estimate a touch region and a region away from a right end point of the corresponding touch region in a rightward direction by a predetermined distance or more as hidden regions that are hidden by the user's hand when the user is right-handed;

estimate a touch region and a region away from a left end point of the corresponding touch region in a leftward direction by a predetermined distance or more as the hidden regions when the user is left-handed; and designate the estimated hidden regions as the non-target region.

\* \* \* \* \*